(12) United States Patent
Sweeney

(10) Patent No.: US 8,402,451 B1
(45) Date of Patent: Mar. 19, 2013

(54) DUAL MODE EVALUATION FOR PROGRAMS CONTAINING RECURSIVE COMPUTATIONS

(75) Inventor: Timothy Dean Sweeney, Cary, NC (US)

(73) Assignee: Epic Games, Inc., Carry, NC (US)

( * ) Notice: Subject to any disclaimer, the term of this patent is extended or adjusted under 35 U.S.C. 154(b) by 1353 days.

(21) Appl. No.: 11/276,866

(22) Filed: Mar. 17, 2006

(51) Int. Cl.
*G06F 9/45* (2006.01)

(52) U.S. Cl. ...................................................... 717/158

(58) Field of Classification Search .................. 718/100, 718/106, 102; 712/216, 226; 711/170, 163; 717/140, 146, 153–158; 714/100
See application file for complete search history.

(56) References Cited

U.S. PATENT DOCUMENTS

| | | | |
|---|---|---|---|
| 4,330,822 A | | 5/1982 | Dodson |
| 4,435,753 A | | 3/1984 | Rizzi |
| 4,525,780 A | * | 6/1985 | Bratt et al. ..................... 711/163 |
| 5,179,702 A | * | 1/1993 | Spix et al. ...................... 718/102 |
| 5,247,696 A | | 9/1993 | Booth |
| 5,526,522 A | | 6/1996 | Takeuchi |
| 5,692,193 A | * | 11/1997 | Jagannathan et al. ........ 718/106 |
| 5,696,971 A | | 12/1997 | Masih |
| 5,923,880 A | | 7/1999 | Rose et al. |
| 5,963,739 A | | 10/1999 | Homeier |
| 6,370,681 B1 | | 4/2002 | Dellarocas et al. |
| 7,017,146 B2 | | 3/2006 | Dellarocas et al. |
| 7,171,655 B2 | * | 1/2007 | Gordon et al. ................. 717/146 |
| 2003/0208743 A1 | | 11/2003 | Chong et al. |
| 2005/0086562 A1 | * | 4/2005 | Demsky et al. ............... 714/100 |
| 2005/0246693 A1 | * | 11/2005 | Plum .............................. 717/140 |

OTHER PUBLICATIONS

Jan-Willem Maessen, "Eager Haskell: Resource-bounded execution yields efficient iteration", MIT.edu, Haskell'02 Oct. 3, 2002, p. 38-50 (EagerHsk_maessen.pdf).*
Harris et al, "Haskell on a Shared-Memory Multiprocessor", Proceedings of Haskell Workshop 2005, Sep. 2005, p. 1-13 (Haskell_multi.pdf).*

* cited by examiner

*Primary Examiner* — Tuan A Vu
(74) *Attorney, Agent, or Firm* — Hunton & Williams LLP

(57) ABSTRACT

A dual evaluation mode method for use with computer software that includes the acts of determining, for certain functions and expressions within input computer code, whether each function and expression may have any recursive dependencies, generating eager evaluation mode executable code for one or more elements of the input computer code based on the act of determining and providing both eager evaluation mode executable code and non-eager evaluation mode executable code to runtime software that supports both eager and non-eager evaluation modes.

45 Claims, 7 Drawing Sheets

DUAL MODE EVALUATION FOR PROGRAMS CONTAINING RECURSIVE COMPUTATIONS

FIELD OF THE INVENTION

Embodiments of the present invention relate to providing a dual-mode code evaluation methodology supporting eager and non-eager evaluation for programs containing recursive computations.

BACKGROUND OF THE INVENTION

Currently, most software is written in text form (herein referred to as "source code") in a programming language. Another program, called a compiler, translates program source code to program executable code. Runtime software is then typically used to assist in executing the program at "runtime," which refers to the time at which the program executes.

Compilers and runtime software programs use what is called an evaluation scheme to determine how to generate executable code from source code and how to process executable code at runtime. An evaluation scheme is a technique for computing actual values (such as 7) from expressions (such as x+1) at runtime. An evaluation scheme generally takes as input both a fragment of executable code (such as the code x+1) and a program environment describing the values of local variables (such as the environment x=6) that are accessed by the executable code in determining the resulting value generated by the executable code in that context. The result of evaluation is typically either a simple value (such as 7) or an error code. Evaluation may also cause side effects (such as modifying the contents of mutable storage.)

One problem with existing programming languages, compilers and runtime software programs relates to recursive computations in programs. Specifically, an out-of-order recursive program is a computer program that is capable of accessing values before they have been sequentially evaluated. For example, "x=(x[1]+1,7)" defines an array "x" recursively. The first element is defined as the second element, x[1], plus one, and the second element is defined as 7. Thus the expected resulting value of the x is (8,7). To ascertain that, the second element had to be evaluated before the evaluation of the first element completed. Many programming languages, such as C and Java, do not support this style of out-of-order recursive programming, and instead expect the programmer to write only programs that access values subsequent to their sequential initialization.

Many types of problems may be solved more easily or compactly using recursive out-of-order programming constructs than traditional in-order programming constructs. Such out-of-order recursive programs present problems for existing evaluation schemes. Programmers must then avoid use of out-of-order recursive functions or recognize that the program may not operate fully as intended if the evaluation scheme is unable to properly handle the out-of-order recursive function.

These and other drawbacks exist with current systems.

SUMMARY OF THE INVENTION

Accordingly, various exemplary embodiments of the present inventions may be directed to a dual evaluation mode method for use with computer software that includes the acts of determining, for certain functions and expressions within input computer code, whether each function and expression may have any recursive dependencies, generating eager evaluation mode executable code for one or more elements of the input computer code based on the act of determining and providing both eager evaluation mode executable code and non-eager evaluation mode executable code to runtime software that supports both eager and non-eager evaluation modes.

Also, in various versions of these embodiments, the method may involve generating non-eager evaluation mode executable code for one or more of the one or more elements of the input computer code (e.g., using different combinations of thunks and values in its parameters and program environment). The non-eager evaluation mode executable code may be generated for every function in the input computer code. Also, the runtime software may invoke the eager evaluation executable code for one or more of the elements rather than non-eager evaluation mode executable code. In this example, the runtime software may invoke the eager evaluation executable code based on a determination that doing so will generate observably equivalent results to the non-eager evaluation executable code for the element.

In other examples, the method may involve generating an entirely lenient version of every function in the input computer code where all parameters and captured environment data are stored as thunks and/or all parameters and environmental data are stored as values.

In other examples, the method may involve accepting captured program environment data stored in a combination of thunks and values. In this example, a process for converting a set of program environment data stored in thunks to new set of program environment data stored as values, using normalization may be used. Or, a process for converting a set of program environmental data stored in values to a new set of program environment data stored as thunks containing those values may be used.

In other examples, the method may involve logging one or more writes of thunks to mutable storage cells, intercepting reads to mutable storage cells, and returning the most recently logged thunk for that storage cell. Or, the method may involve evaluating one or more thunks to a value and storing the values in an unboxed representation. Or, the method may involve annotating one or more thunks with information related to the computational effects they may cause and evaluating effect-causing thunks out of order when the compiler or runtime environment determines that executing those effects out of order will produce the same observable results as executing them sequentially.

In other examples, the method may involve tracking, for one or more thunks, one or more dependencies on other thunks which should be executed sequentially prior to the thunk. Here, the method may further evaluate the thunk by first evaluating the one or more other thunks.

In other examples, the method may involve detecting thunk reentrancy and optionally reporting an thunk reentrancy error to a user. The error message may comprise diagnostic information, such as information related to the program context in which the thunk's program expression was defined. Upon detecting thunk reentrancy, the method may involve causing an exception that can be caught and explicitly handled by the program.

In other examples, the acts may be performed in conjunction with storing a multithreaded lock in thunks, which lock enables multiple threads in a program to coordinate access to the thunk. In this example, a scheme may be employed that wherein when a thread encounters an thunk that is unlocked and has not been normalized, it may lock the thunk, normalize it, update the thunk to contain its value, and then unlock it; and when a thread encounters a thunk that is locked and has not been normalized, it may either suspend execution and wait for the thunk to be unlocked and then use its value, or execute other pending work. Thunks may also be enqueued in a thread-safe work queue so they may be identified and normalized by other threads.

Other embodiments may be considered.

DETAILED DESCRIPTION OF EXEMPLARY EMBODIMENT(S)

Figure 1:
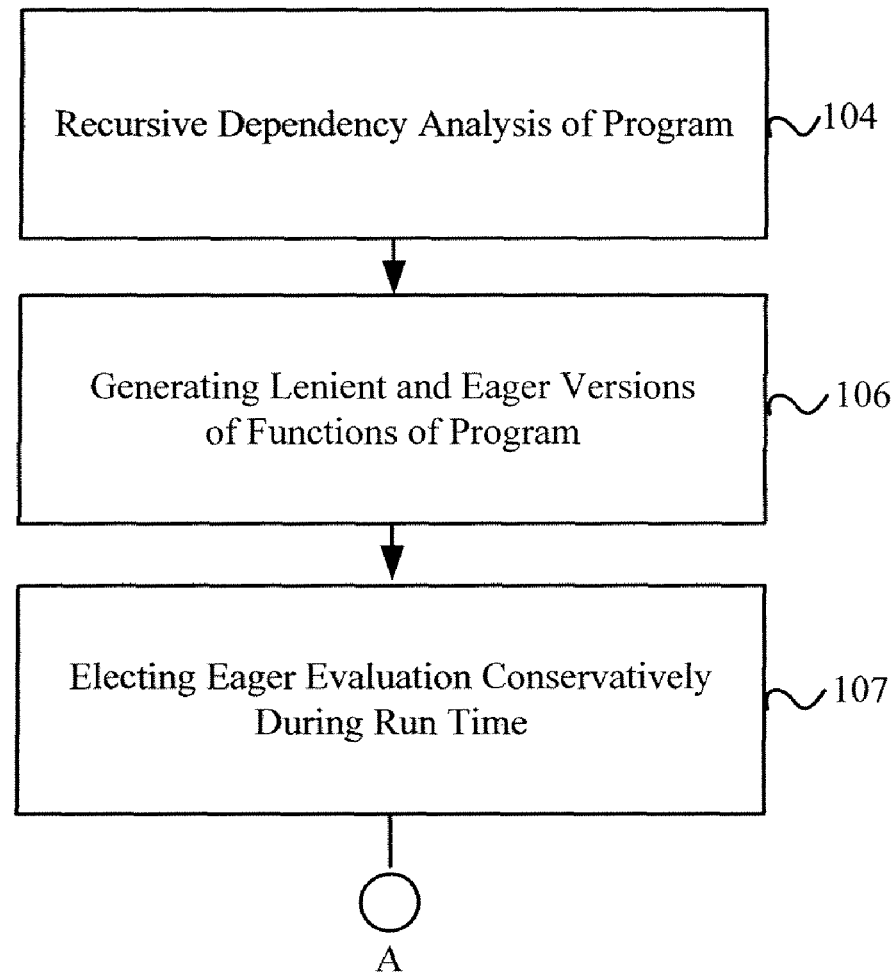
FIG. 1 depicts a schematic diagram of a methodology according to an embodiment of the present invention.
Figure 2:
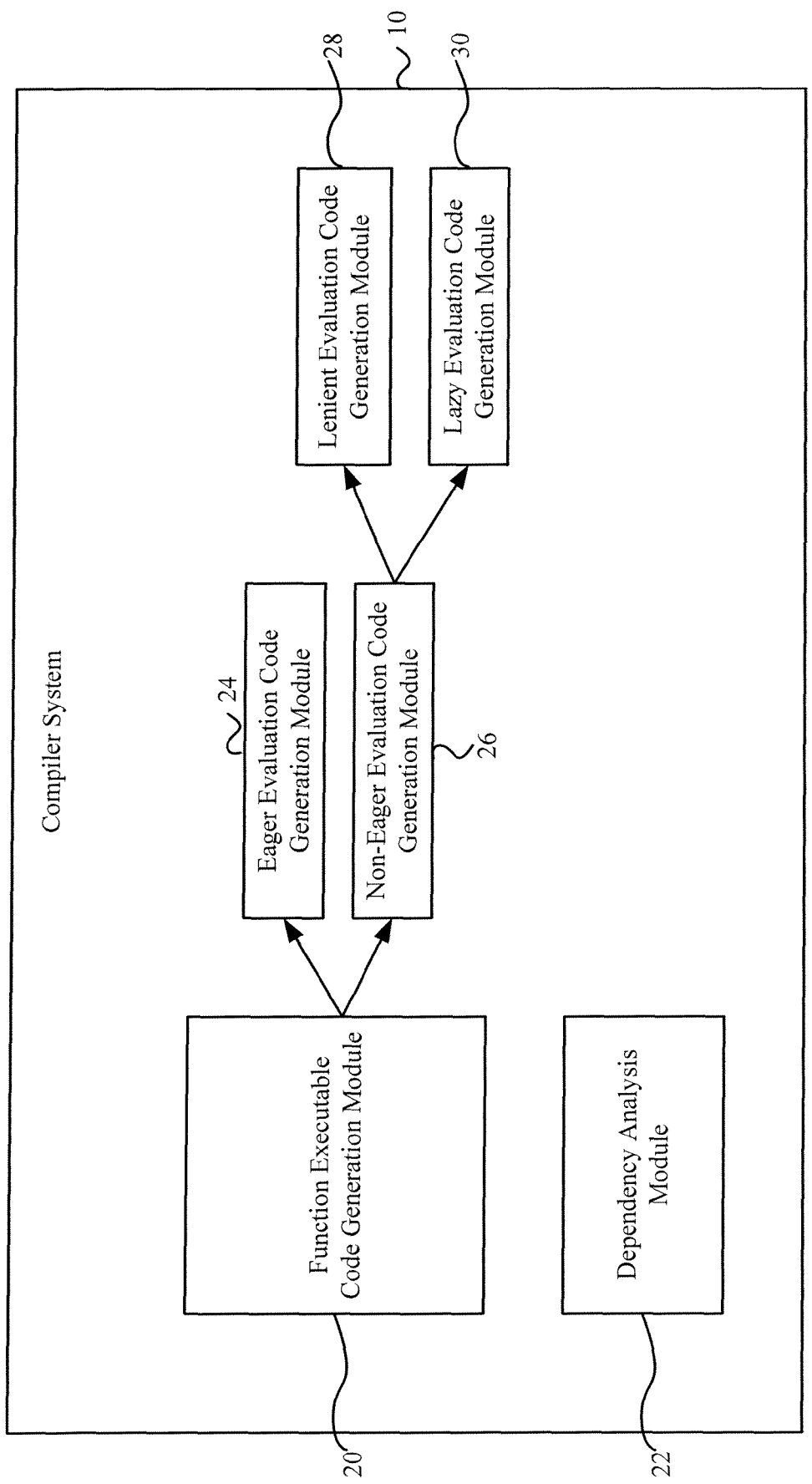
FIG. 2 depicts a schematic diagram of a compiler system according to an embodiment of the present invention.

Exemplary embodiments of the invention are discussed in detail below. While specific exemplary embodiments are discussed, it should be understood that this is done for illustration purposes only. A person skilled in the relevant art will recognize that other components and configuration can be used without departing from the spirit and scope of the invention.

Accordingly, various embodiments of the present invention address failings of prior software by providing one or more of the following elements: a programming language runtime software supporting what is known as non-eager evaluation (e.g., lenient evaluation and/or lazy evaluation), explained below; a dependency analysis methodology employed by a compiler and/or runtime software to determine whether during evaluation of an expression, the evaluation of its sub-expressions recursively access the value of the original expression; an election system that elects eager evaluation on sub-elements of a program where the runtime software can determine that doing so will be safe (e.g., generating observably equivalent results to non-eager evaluation); and an executable code generation system that is capable of generating two or more versions of executable code (e.g., at least one eager evaluation version and a non-eager evaluation version) for the election system to choose during runtime.

Some of the terminology used herein may be understood as follows:

Eager evaluation may be understood to be the evaluation scheme used by the C, C++, Java and C# programming languages. With eager evaluation, all terms in a program are evaluated in a purely sequential order determined by the order of the program source code. This scheme has the advantage of efficiency: the runtime software can always access every value referenced without checking whether it has been fully evaluated. The disadvantage is such a language cannot correctly evaluate recursive programs that make use of certain values that have not yet been initialized. For example, if the example x=(x[1]+1,7) were translated into C or C++, the resulting program would attempt to read the second value before it has been initialized, resulting in an unpredictable result such as (11,10) or (−9,−10). Java and C# always pre-initialize such fields to zero prior to evaluating their proper value, so the result would always be (1,7).

Translated into C, that code is:
int x[2];
x[0]=x[1]+1;
x[1]=7;

There are also a number of evaluation schemes with expressive power that exceeds eager evaluation, including lazy evaluation and lenient evaluation.

Lazy evaluation is the evaluation scheme used by the Haskell programming language. When an expression is evaluated using this scheme, the evaluation system creates a data structure known as a "thunk" that contains both the executable code the compiler has generated for the expression, and a "program environment" containing the contents of local and global variables that may be referenced by the expression. More specifically, the program environment maps every local variable (by name, memory offset, or some other identification scheme) to either a value (representing the value of the variable in the current context) or a thunk (containing a sub-computation capable of generating the value of that variable on-demand). A thunk may normalized, which is generally understood to be the process of executing the code and updating the thunk to contain its resulting value. Lazy evaluation enables thunks to be created and their evaluation deferred until later, so that their value can be determined on-demand. For example, in evaluating x=(x[1]+1,7), first, a pair of thunks (A,B) is created (the thunk A containing the expression x[1]+1 and the thunk B containing the expression 7, and both associating the variable x recursively to the array value (A,B) which recursively references both thunks). Normalizing those thunks would be done by first reviewing thunk A, containing the expression x[1]+1. Because x[1] refers to the to thunk B (containing the expression 7), thunk B would be normalized first, resulting in the value 7. Thunk A would then be evaluated as 7+1=8. Thus this expression may be safely evaluated out-of-order, resulting in the expected value of (8,7).

Figure 7:
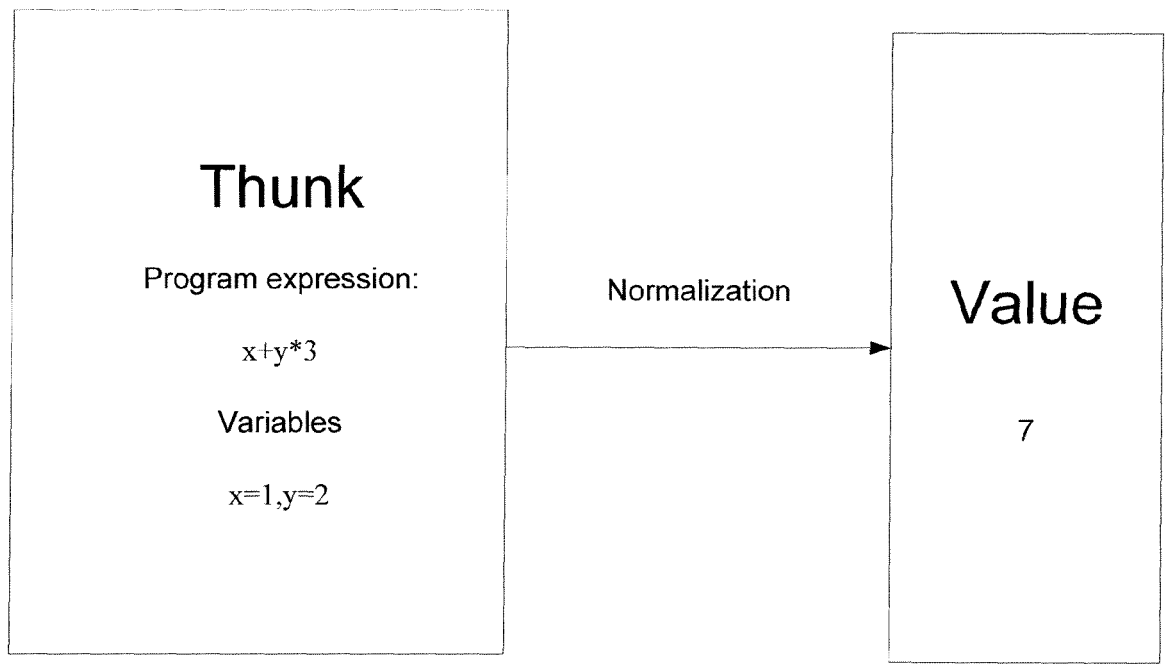
FIG. 7 depicts a schematic of a thunk being normalized into a value according to an embodiment of the present invention.

For clarity, FIG. 7 depicts a schematic showing a thunk being normalized into a value. In this example, the thunk is defined by an expression "x+y*3" and is provided with inputs x=1 and y=2. The value, when normalized, would be 7.

Lenient evaluation is a hybrid scheme with expressive power in between eager evaluation and lazy evaluation. In the lazy evaluation scheme, it is possible for a thunk to be abandoned without ever being normalized, provided any executed portion of the program does not use its value. With lenient evaluation, the runtime software assures that every thunk is always normalized eventually (possibly out-of-order), while still preserving the ability to perform out-of-order evaluation.

Lenient evaluation and lazy evaluation differ in one observable way: divergence. A subexpression of a program is said to diverge if its evaluation never completes—for example if it goes off into an infinite loop, or crashes the runtime software. Otherwise, it is said to converge. In a lenient evaluator, every thunk encountered that represents a divergent computation is guaranteed to cause program execution to diverge. In a lazy evaluator, thunks are only normalized when their value is required by another expression—which might never occur. Thus using lazy evaluation, a convergent program may contain divergent thunks, provided that their value is not required in any computation affecting the final program result.

One of the problems with existing systems is that creating and managing the thunks required for non-eager evaluation are very costly operations for the runtime software. Thunk-based non-eager evaluation typically incurs a 10× to 20× performance penalty compared to eager evaluation. This is one reason why existing mainstream programming languages opt to use the less powerful eager evaluation scheme. Through the techniques described herein, programmers may utilize non-eager evaluation schemes efficiently, avoiding the cost of thunk-based evaluation when it is not required (e.g. when evaluating expressions that do not contain out-of-order recursive dependencies). The techniques described herein are an improvement over existing evaluation techniques and also an improvement over the strictness analysis scheme that has previously been attempted to try to optimize existing lazy evaluation schemes. Strictness analysis determines cases where a thunk is guaranteed to always be normalized but never be encountered recursively. Upon making that strictness analysis, those thunks that will never be encountered recursively do not need to be created. Rather, the expression can be evaluated immediately using eager evaluation and guarantee that the program will still operate correctly. Strictness analysis provides limited benefit because the code analysis required for the runtime software to determine that the thunk is guaranteed to be normalized is difficult and frequently incapable of precisely determining strictness. Where strictness cannot be precisely determined, to assure correctness the runtime software must assume that thunks are required, at a significant performance penalty. It should be appreciated that when attempting to optimize evaluation schemes, conservative optimization is preferably employed. By conservative, it should be understood that an eager-optimized version of a program should produce observably equivalent results to the program using the language as the standard evaluation scheme, which may be, for example, lazy evaluation. In this context, the phrase "observably equivalent" means that if the original version of the program diverges on a machine with unlimited resources then the optimized version must also diverge on such a machine. And, if the original version converges and produces a value on such a machine, then the optimized version must also converge and produce the same value on such a machine. As a general practice, such analysis of observable equivalence ignores the question of whether differences in resource usage and resource limitations lead to observable differences in behavior between the optimized and non-optimized version of the program.

Various embodiments of the present invention provide a dual mode evaluation technique in which a programming language may defined as guaranteeing the expressive power of lenient or lazy evaluation, while enabling the compiler and/or runtime environment to safely optimize the program to use the more efficient eager evaluation scheme where this is assured to produce observably equivalent results. Such optimization is possible on terms which are free of recursive out-of-order dependencies. In one embodiment using the lenient evaluation scheme, the runtime software guarantees that every term is eventually normalized; thus the "strictness analysis" step required for optimizing programs in a lazy evaluation scheme may be replaced with a simpler recursive dependency analysis. Using that analysis, the system may determine for each term, whether it can safely be evaluated eagerly. This technique may be applied on a larger scale to enable executing large portions of a program, including complex nested sequences of sub-expressions and procedure calls eagerly, without sacrificing safety.

According to one embodiment of the present invention, a methodology 100 may be provided as depicted in FIG. 1. Methodology 100 describes the steps taken by an optimizing compiler and/or runtime environment in efficiently executing program code in a language defined with non-eager (lenient or lazy) evaluation semantics. In process 104 may involve recursive dependency analysis of a program. And a third process 106 may involve generating lenient and eager versions of functions of a program.

Process 104 involves recursive dependency analysis of the program. In this process, the compiler and/or runtime software determines (e.g. conservatively) whether during the evaluation of an expression E, whether the evaluation of any of its subexpressions E' may recursively access the value of E out-of-order. For example, in the expression $x=(x[1]+1, 7)$, the top-level expression $x=\ldots$ is indeed recursively accessed by the subterm $x[1]$. But the term $x[1]+1$ and 7 (and also all of their subterms) are not recursively accessed during their own evaluation. And in the expression $x=(3,x[0]+1)$, though the term x is indeed accessed recursively, the access of $x[0]$ is in-order because it occurs sequentially after the value 3 (the result of evaluating $x[0]$) is evaluated. Such a dependency analysis scheme thus enables the system to assess for each element of an expression whether there are any out-of-order recursive dependencies.

Many dependency analysis schemes are known. All such schemes are hereby incorporated by reference. One of ordinary skill in the art will appreciate that particular technique that is used may change but preferably such analyses will involve some conservative analysis. By conservative analysis, it is understood that such a system would be appropriate if it determines that the expression is recursively accessed when it is not, but it is not okay for this scheme to determine that the expression is never recursively accessed when it actually is.

Process 106 may involve generating for each function, expression, and/or sub-expression that is not recursively referenced by its subterms, two or more versions of executable code. At least one version of the executable code may comprise eager evaluation executable code and another version may comprise non-eager evaluation executable code (e.g., lenient evaluation executable code and/or lazy evaluation executable code). Different versions of executable code may be generated for certain functions, expressions and/or sub-expressions to enable invocation of the functions supporting varying amounts of eager evaluation on some subset of its program environment, noting again that a thunk's program environment may associate variables with values, thunks, or some combination thereof. For example, the different versions of the executable code may expect a different combination of thunks and values in its parameters and program environment. In general, code dealing with values is more efficient than code dealing with thunks. This is so because the computer can simply read a value whereas normalizing a thunk requires invoking arbitrary code and then extracting the resulting value.

The generation of separate lenient or lazy evaluations executable code for each function, expression, or sub-expression as well as an eager evaluation version of the executable code for each function, expression or sub-expression or a subset of all functions, expressions, and sub-expressions, enables the election process of 107 to choose between the two or more different executable codes during runtime. To enable the delivery of the methodologies described in FIG. 1, a number of systems may be provided. First, a compiler system 10 may be provided that comprises one or more of the following modules: a function executable code generation module 20, a dependency analysis module 22, an eager evaluation code generation module 24, a non-eager evaluation code generation module 26, a lenient evaluation code generation module 28, and a lazy evaluation code generation module 30.

Function executable code generation module 20 may generate executable code versions for source code that is provided to it. It may cooperate with modules 24, 26, 28, and 30 to generate the appropriate different versions based upon what is desired. For example, it may be desired to generate an eager evaluation version using module 24 as well as a lenient evaluation version using module 28. It is also possible that the module 20 may generate an eager evaluation version as well as a lazy evaluation version and a lenient evaluation version of executable code. Such objects may then be stored in storage system 32 or elsewhere. For example, these objects may be delivered to run time software 12 on demand from compiler 10, stored at a location accessible by run-time software 12 or incorporated into executable versions of run-time software 12, or otherwise stored for use by run-time software 12.

Figure 3:
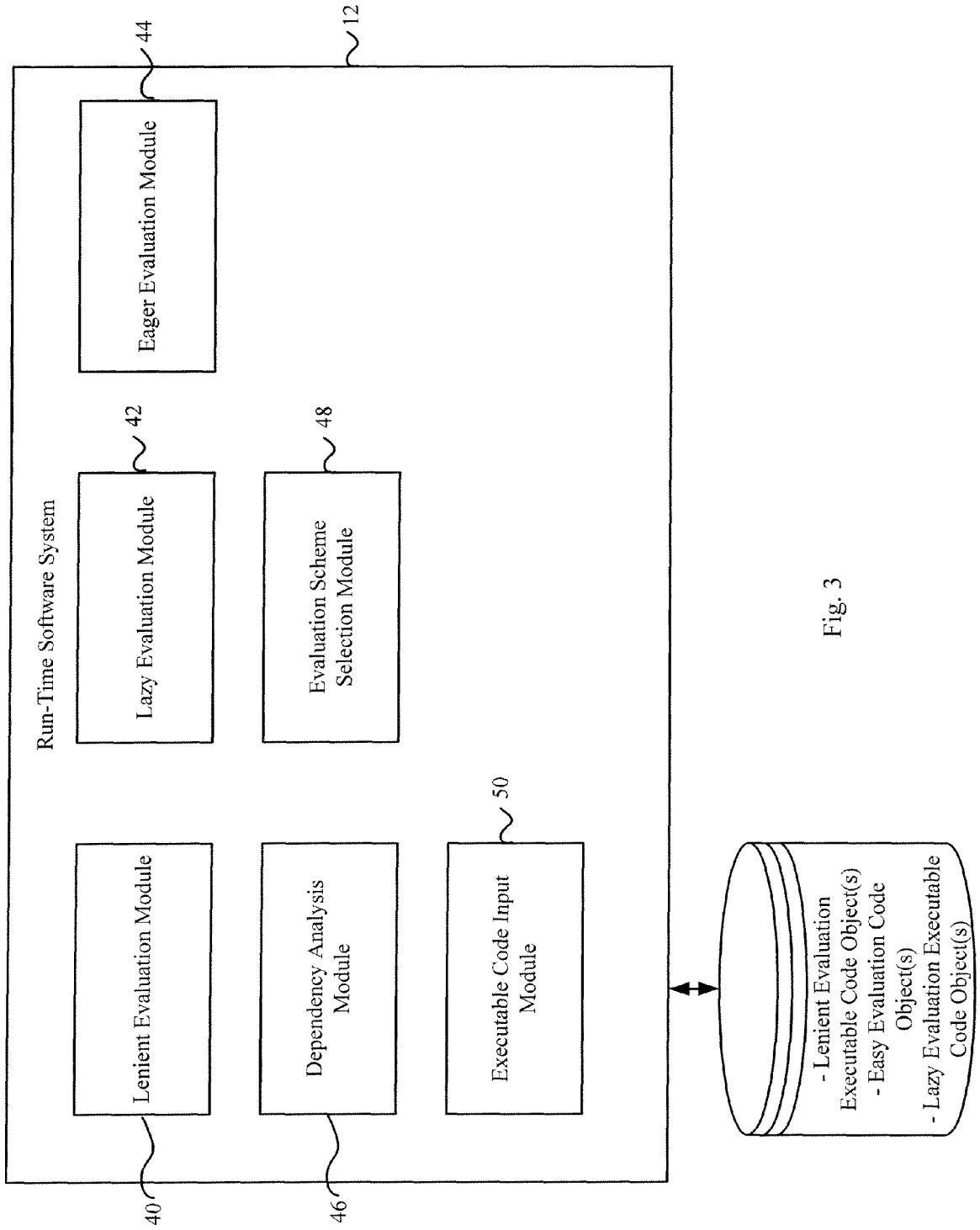
FIG. 3 depicts a runtime software system according to an embodiment of the present invention.

FIG. 3 depicts a runtime software system 12 according to one embodiment of the present invention. Runtime software system 12 may comprise one or more of the following modules: lenient evaluation module 40, lazy evaluation module 42, eager evaluation module 44, dependency analysis module 46, evaluation scheme selection module 48, and executable code input module 50. It should be appreciated that runtime software system 12 may cooperate with one or more database systems 32 which may store lenient evaluation executable code objects, easy evaluation executable code objects and/or lazy evaluation executable code objects.

Lenient evaluation module 40 may operate to provide the functionality necessary to evaluate lenient evaluation type executable code. Lazy evaluation module 42 may provide the functionality useful to execute lazy evaluation executable code. Eager evaluation module 44 may provide functionality useful to execute easy evaluation executable code. Dependency analysis module 46 may operate as described above with regard to process 104. Evaluation scheme selection module 48 may operate as according to the process described above with respect to process 107. Executable code input module 50 may receive executable code from storage 32 for providing it to runtime software system 12 in cooperation with the various modules 40 through 44.

Figure 4:
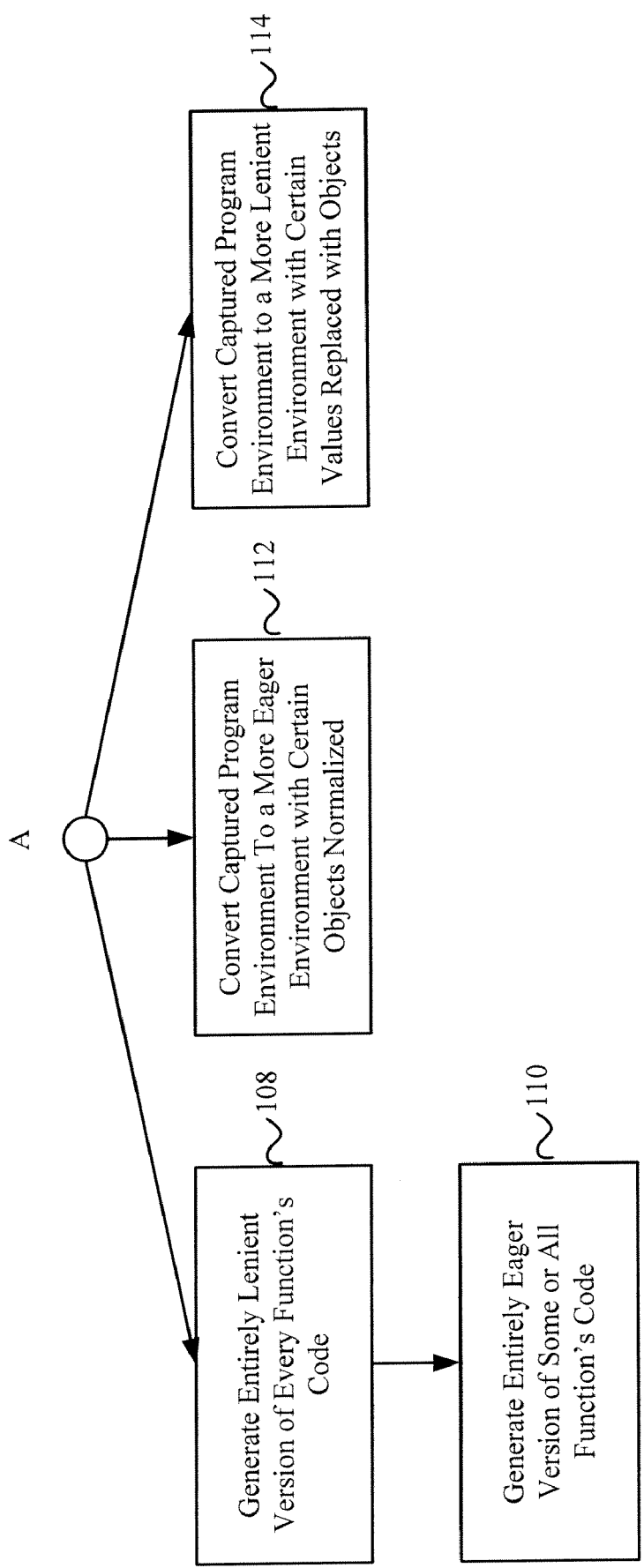
FIG. 4 depicts optional methodology according to various embodiments of the present invention.
Figure 5:
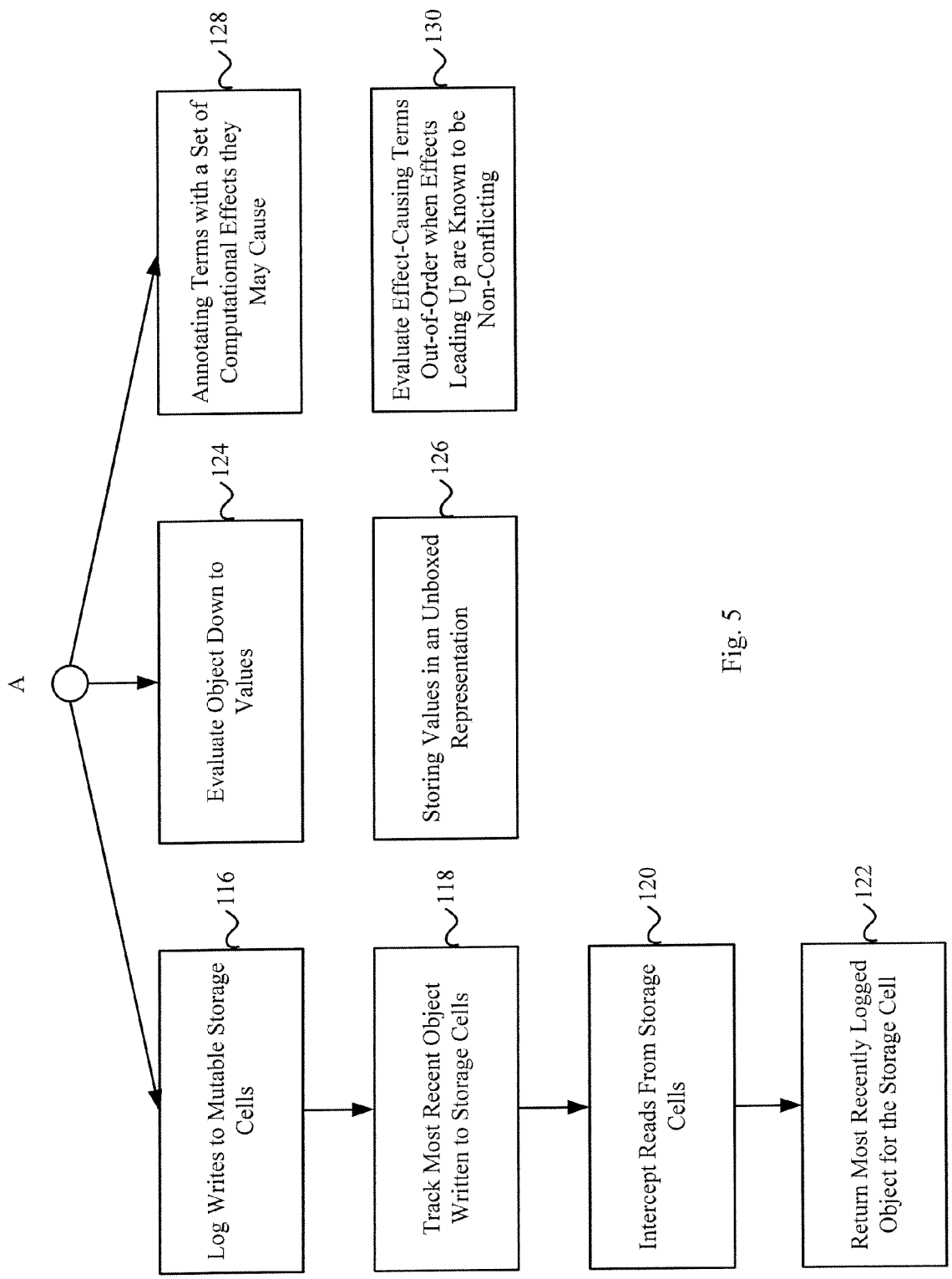
FIG. 5 depicts additional optional methodology according to various embodiments of the present invention.
Figure 6:
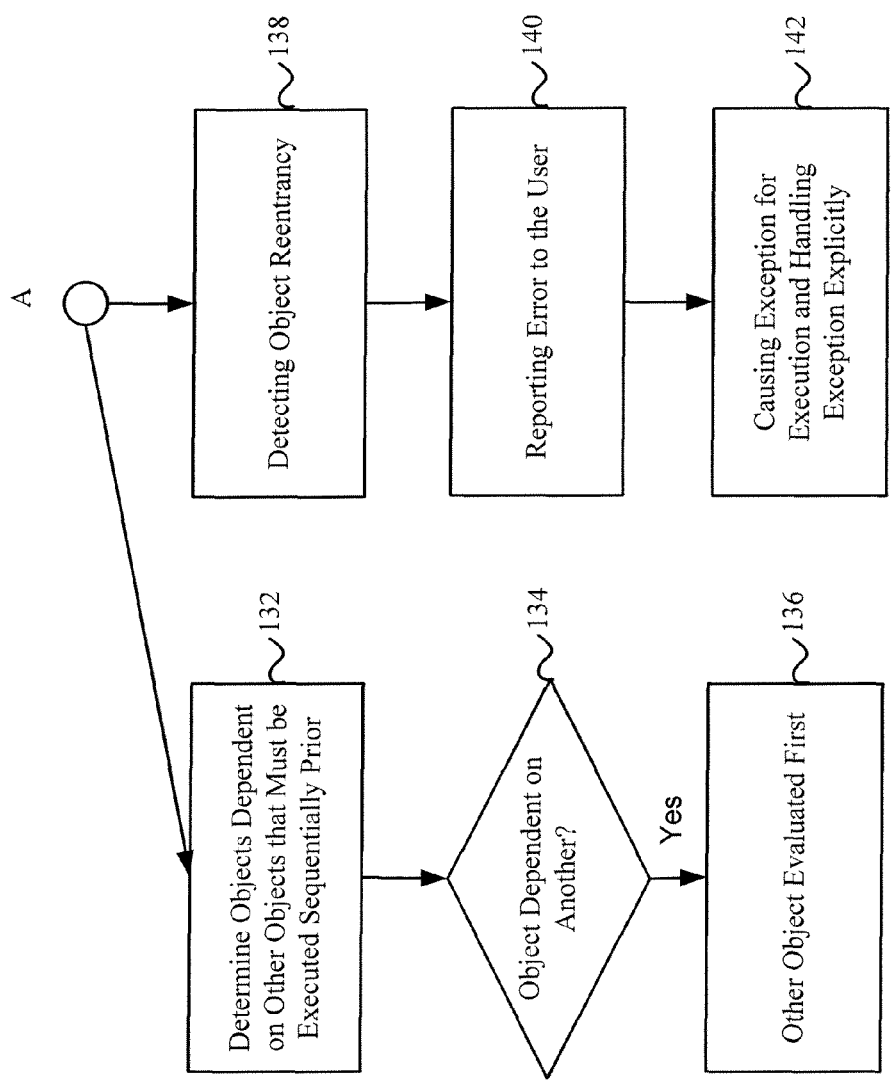
FIG. 6 depicts further additional optional methodology according to various embodiments of the present invention.

FIGS. 4-6 depict additional methodologies that may optionally be performed. In method 108, compiler 10 may generate entirely lenient version(s) of every function's code where all parameters in the captioned environment are expected to be stored as thunks rather than values and where, for certain functions, in method 110, the system generates entirely eager versions for some or all of the function's code (expecting all parameters in the captured environment to be stored as values). These additional processes 108 and 110, provide a simple concrete implementation of an optimization scheme.

It is also possible to implement a process 112 wherein all captured program environment is converted to a more eager environment with certain thunks being normalized and replaced with corresponding values. This is an optimization that can be applied in a lenient evaluation context where a function is invoked and the system realizes that some of the dependencies can be determined up front to improve efficiency.

In a process 114, the system may convert captured program environment (e.g., stored in a combination of thunks and values) to a more lenient program environment with certain of the values replaced with thunks containing those values. This is a simplification that enables the system to generate a small number of variance of each function (as few as one). For example, suppose that there are 10 captured program environments and some subset of them are eager (e.g. stored as values rather than thunks), and another function is to be invoked, the system may fall back to executing an entirely lenient (or a more lenient than necessary) version of that function to avoid the need for generating a combinatorially huge number of variations.

Another optional process involves methodologies 116-122. In method 116, the system logs all write operations made to mutable storage cells. In method 118, the system may track the most recent thunk written for each mutable storage cell. In 120, the system may intercept reads from the storage cells and in 122, may return the most recently logged thunk for the storage cell. As used herein, the phrase mutable storage cell may be understood as the general term for what many program languages such as C and C++ call pointers and what Java and C# call references. These processes enable lenient evaluation to become more practical when dealing with mutable storage and transactional memory.

Another optional method may be as provided with reference to methods 124 and 126. In method 124, each thunk may be evaluated down to its values and the values may be stored in 126 as unboxed representations. A boxed representation of values is generally a high overhead way of storing a value along with sufficient type information that it can be passed around to any program contact without knowing its type. An unboxed representation stores only the actual value in a low level machine native format (such as a 32 bit integer); an unboxed value only makes sense to a program when its type is known from other considerations. An example here would be if the system is provided a thunk that generates an array of two integers, each represented by a thunk, this technique may recursively evaluate all thunks and return the array as a value in an efficient encoding, such as a pair of 32 bit integers in memory.

Another optional method may involve methods 128 and 130. In method 128, the system may annotate terms with a set of computational effects they may cause. In 130, the system may evaluate effect-causing terms out-of-order when effects leading up to them are known to be nonconflicting. Some examples of effects include potential divergence, exception causing, invoking input/output, and/or heap access (allocation, reading, writing). For example, a thunk that reads from memory may be executed out of order relative to other thunks that only read from memory and allocated from memory, but a thunk that writes to memory must be executed sequentially compared to other reads from that same location. In one example, in method 132, the system determines thunks that are dependent on other thunks that must be executed sequentially prior. Then in method 134, the system determines whether an thunk depends on another. If it does, in 136, the other thunk is evaluated first.

Other methodologies may be depicted in FIG. 6. For example, given a sequence of C-style codes as follows:

int A=7
   int b=c+1
   a=a+10
   int c=a+1

The system can safely evaluate this code sequence out of order as follows: Generate thunks for all four top level terms (the three definition terms and the one mutable storage update term; evaluate A to be equal to 7; start evaluating b as c+1; recursively start evaluating c=a+1; the c=a+1 thunk is tagged as dependent on the term a=a+10, so the system evaluates that first; evaluate a=a+10 which updates the storage cell a; finish evaluating c=a+1; resulting in c=17; finish evaluating b=c+1 resulting in 18.

Another optional optimization may be provided, as depicted relative to methods 138-142. In 138, there is a mechanism depicting thunk reentrancy and reporting the error to the user in 140. Thunk reeentrancy refers to the case where the evaluation of a thunk recursively references the original thunk before its evaluation has completed. Thus a completely circular definition like x={x[0],7} would cause thunk reentrancy. In step 142, a programming language mechanism may be added for tracking thunk reentrancy and causing an exception, which may be caught by the program and handled explicitly.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for converting a set of program environment data stored in thunks to new set of program environment data stored as values, using normalization, and accepting captured program environment data stored in a combination of thunks and values, comprising:
   first determining, using a computer, for certain functions and expressions within input computer code, whether each function and expression may have any recursive dependencies;
   generating eager evaluation mode executable code for one or more elements of the input computer code based on the act of determining;
   providing both eager evaluation mode executable code and non-eager evaluation mode executable code to runtime software that supports both eager and non-eager evaluation modes;
   second determining that executing the eager evaluation executable code for one or more of the elements will generate observably equivalent results to the non-eager evaluation executable code for the one or more of the elements;
   invoking, using the runtime software, the eager evaluation executable code based on the determination;
   logging one or more writes of thunks to mutable storage cells;
   intercepting reads to mutable storage cells;
   annotating one or more thunks with meaningful information related to the computational effects they may cause; and
   returning the most recently logged thunk for that storage cell in order to make a next or subsequent iterative step of second determining.

2. The method of claim 1 further comprising:
   generating non-eager evaluation mode executable code for one or more of the one or more elements of the input computer code.

3. The method of claim 2 wherein non-eager evaluation mode executable code is generated for every function in the input computer code.

4. The method of claim 2 further comprising generating versions of executable code using different combinations of thunks and values in its parameters and program environment.

5. The method of claim 1 further comprising:
   generating an entirely lenient version of every function in the input computer code where all parameters and captured environment data are stored as thunks.

6. The method of claim 5 further comprising:
   generating, for certain functions, an entirely eager version of the input computer code where all parameters and captured environment data are stored as values.

7. The method of claim 1 further comprising accepting captured program environment data stored in a combination of thunks and values.

8. The method of claim 7 further comprising a process for converting a set of program environment data stored in thunks to new set of program environment data stored as values, using normalization.

9. The method of claim 7 further comprising a process for converting a set of program environmental data stored in values to a new set of program environment data stored as thunks containing those values.

10. The method of claim 1 further comprising tracking, for one or more thunks, one or more dependencies on other thunks which should be executed sequentially prior to the thunk.

11. The method of claim 10 further comprising evaluating the thunk by first evaluating the one or more other thunks.

12. The method of claim 1 further comprising detecting thunk reentrancy.

13. The method of claim 12 further comprising reporting an thunk reentrancy error to a user.

14. The method of claim 13 wherein the error comprises diagnostic information.

15. The method of claim 14 wherein the diagnostic information comprises information related to the program context in which the thunk's program expression was defined.

16. The method of claim 12 further comprising, upon thunk reentrancy, causing an exception that can be caught and explicitly handled by the program.

17. The method of claim 1 wherein the acts are performed in conjunction with storing a multithreaded lock in thunks, which lock enables multiple threads in a program to coordinate access to the thunk.

18. The method of claim 17 wherein the acts are performed in conjunction with a scheme wherein:
   when a thread encounters an thunk that is unlocked and has not been normalized, it may lock the thunk, normalize it, update the thunk to contain its value, and then unlock it;
   when a thread encounters a thunk that is locked and has not been normalized, it may either suspend execution and wait for the thunk to be unlocked and then use its value, or execute other pending work.

19. The method of claim 17 where thunks are enqueued in a thread-safe work queue so they may be identified and normalized by other threads.

20. A system for converting a set of program environment data stored in thunks to new set of program environment data stored as values, using normalization, and accepting captured program environment data stored in a combination of thunks and values, comprising:
   one or more computer processors configured to:
      determine, using a computer, for certain functions and expressions within input computer code, whether each function and expression may have any recursive dependencies;

generate eager evaluation mode executable code for one or more elements of the input computer code based on the act of determining;

provide both eager evaluation mode executable code and non-eager evaluation mode executable code to runtime software that supports both eager and non-eager evaluation modes;

determine that executing the eager evaluation executable code for one or more of the elements will generate observably equivalent results to the non-eager evaluation executable code for the one or more of the elements;

invoke, using the runtime software, the eager evaluation executable code based on the determination;

evaluate one or more thunks to a value;

store the values in an unboxed representation;

annotate one or more thunks with information related to the computational effects they may cause; and evaluate effect-causing thunks out of order to determine in what way eager/non-eager evaluation will be executed when the compiler or runtime environment determines that executing those effects out of order will produce the same observable results as executing them sequentially.

21. The system of claim 20 further comprising:
generating non-eager evaluation mode executable code for one or more of the one or more elements of the input computer code.

22. The system of claim 21 wherein non-eager evaluation mode executable code is generated for every function in the input computer code.

23. The system of claim 20 further comprising:
generating an entirely lenient version of every function in the input computer code where all parameters and captured environment data are stored as thunks.

24. The system of claim 20 further comprising accepting captured program environment data stored in a combination of thunks and values.

25. The system of claim 20 further comprising tracking, for one or more thunks, one or more dependencies on other thunks which should be executed sequentially prior to the thunk.

26. The system of claim 25 further comprising evaluating the thunk by first evaluating the one or more other thunks.

27. The system of claim 20 further comprising detecting thunk reentrancy.

28. The system of claim 27 further comprising reporting an thunk reentrancy error to a user.

29. The system of claim 28 wherein the error comprises diagnostic information.

30. The system of claim 29 wherein the diagnostic information comprises information related to the program context in which the thunk's program expression was defined.

31. The system of claim 27 further comprising, upon thunk reentrancy, causing an exception that can be caught and explicitly handled by the program.

32. The system of claim 20 wherein the acts are performed in conjunction with storing a multithreaded lock in thunks, which lock enables multiple threads in a program to coordinate access to the thunk.

33. A method for converting a set of program environment data stored in thunks to new set of program environment data stored as values, using normalization, and accepting captured program environment data stored in a combination of thunks and values, comprising:

determining, using a computer, for certain functions and expressions within input computer code, whether each function and expression may have any recursive dependencies;

generating eager evaluation mode executable code for one or more elements of the input computer code based on the act of determining;

providing both eager evaluation mode executable code and non-eager evaluation mode executable code to runtime software that supports both eager and non-eager evaluation modes;

determining that executing the eager evaluation executable code for one or more of the elements will generate observably equivalent results to the non-eager evaluation executable code for the one or more of the elements;

invoking, using the runtime software, the eager evaluation executable code based on the determination;

evaluating one or more thunks to a value;

storing the values in an unboxed representation;

annotating one or more thunks with information related to the computational effects they may cause; and evaluating effect-causing thunks out of order to determine in what way eager/non-eager evaluation will be executed when the compiler or runtime environment determines that executing those effects out of order will produce the same observable results as executing them sequentially.

34. The method of claim 33 further comprising:
generating non-eager evaluation mode executable code for one or more of the one or more elements of the input computer code.

35. The method of claim 34 wherein non-eager evaluation mode executable code is generated for every function in the input computer code.

36. The method of claim 33 further comprising:
generating an entirely lenient version of every function in the input computer code where all parameters and captured environment data are stored as thunks.

37. The method of claim 33 further comprising accepting captured program environment data stored in a combination of thunks and values.

38. The method of claim 33 further comprising tracking, for one or more thunks, one or more dependencies on other thunks which should be executed sequentially prior to the thunk.

39. The method of claim 38 further comprising evaluating the thunk by first evaluating the one or more other thunks.

40. The method of claim 33 further comprising detecting thunk reentrancy.

41. The method of claim 40 further comprising reporting an thunk reentrancy error to a user.

42. The method of claim 41 wherein the error comprises diagnostic information.

43. The method of claim 42 wherein the diagnostic information comprises information related to the program context in which the thunk's program expression was defined.

44. The method of claim 40 further comprising, upon thunk reentrancy, causing an exception that can be caught and explicitly handled by the program.

45. The method of claim 33 wherein the acts are performed in conjunction with storing a multithreaded lock in thunks, which lock enables multiple threads in a program to coordinate access to the thunk.

* * * * *

UNITED STATES PATENT AND TRADEMARK OFFICE
CERTIFICATE OF CORRECTION

| | | |
|---|---|---|
| PATENT NO. | : 8,402,451 B1 | Page 1 of 1 |
| APPLICATION NO. | : 11/276866 | |
| DATED | : March 19, 2013 | |
| INVENTOR(S) | : Sweeney | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,483 days.

Signed and Sealed this
Eighteenth Day of November, 2014

Michelle K. Lee
*Deputy Director of the United States Patent and Trademark Office*